United States Patent
Ioka

[11] Patent Number: 5,745,190
[45] Date of Patent: Apr. 28, 1998

[54] METHOD AND APPARATUS FOR SUPPLYING DATA

[75] Inventor: Mikihiro Ioka, Tokyo, Japan

[73] Assignee: International Business Machines Corporation, Armonk, N.Y.

[21] Appl. No.: 839,096

[22] Filed: Apr. 23, 1997

Related U.S. Application Data

[63] Continuation of Ser. No. 358,132, Dec. 16, 1994, abandoned.

[30] Foreign Application Priority Data

Dec. 16, 1993 [JP] Japan ................................ 5-316855

[51] Int. Cl.$^6$ .................................................. H04N 7/32
[52] U.S. Cl. ................................................................ 348/700
[58] Field of Search .................................. 348/699, 700, 348/701; 382/236, 253

[56] References Cited

U.S. PATENT DOCUMENTS 5,032,905  7/1991  Koga ........................... 348/700
5,065,446  11/1991 Suzuki et al. .................. 382/253
5,404,174  4/1995  Sugahara ....................... 348/700

*Primary Examiner*—Amelia Au
*Attorney, Agent, or Firm*—Ronald L. Drumheller

[57] ABSTRACT

In order to supply data in which scene switching in a motion picture can be easily detected, pixel data 50 of a motion picture is input and stored in the frame buffer 18 as pixel values 52, and the statistical processor 14 operates the mean value μ and standard deviation α of luminous values using all pixel data 50 of one frame. The conversion table processor 16 sets a pixel conversion table expressing the correspondence between pixel values 52 and normalized output pixel values 54 using the mean value μ and standard deviation α, reads pixel values 54 sequentially, and outputs output pixel values 54 for one frame to the detector 12 using the pixel conversion table. The detector 12 obtains differential values between previous output pixel values 54 and current output pixel values 54, judges that the number of pixels exceeding the threshold value, Vth, corresponds to a frame where a scene is switched, and outputs the scene change detection signal 56.

7 Claims, 5 Drawing Sheets

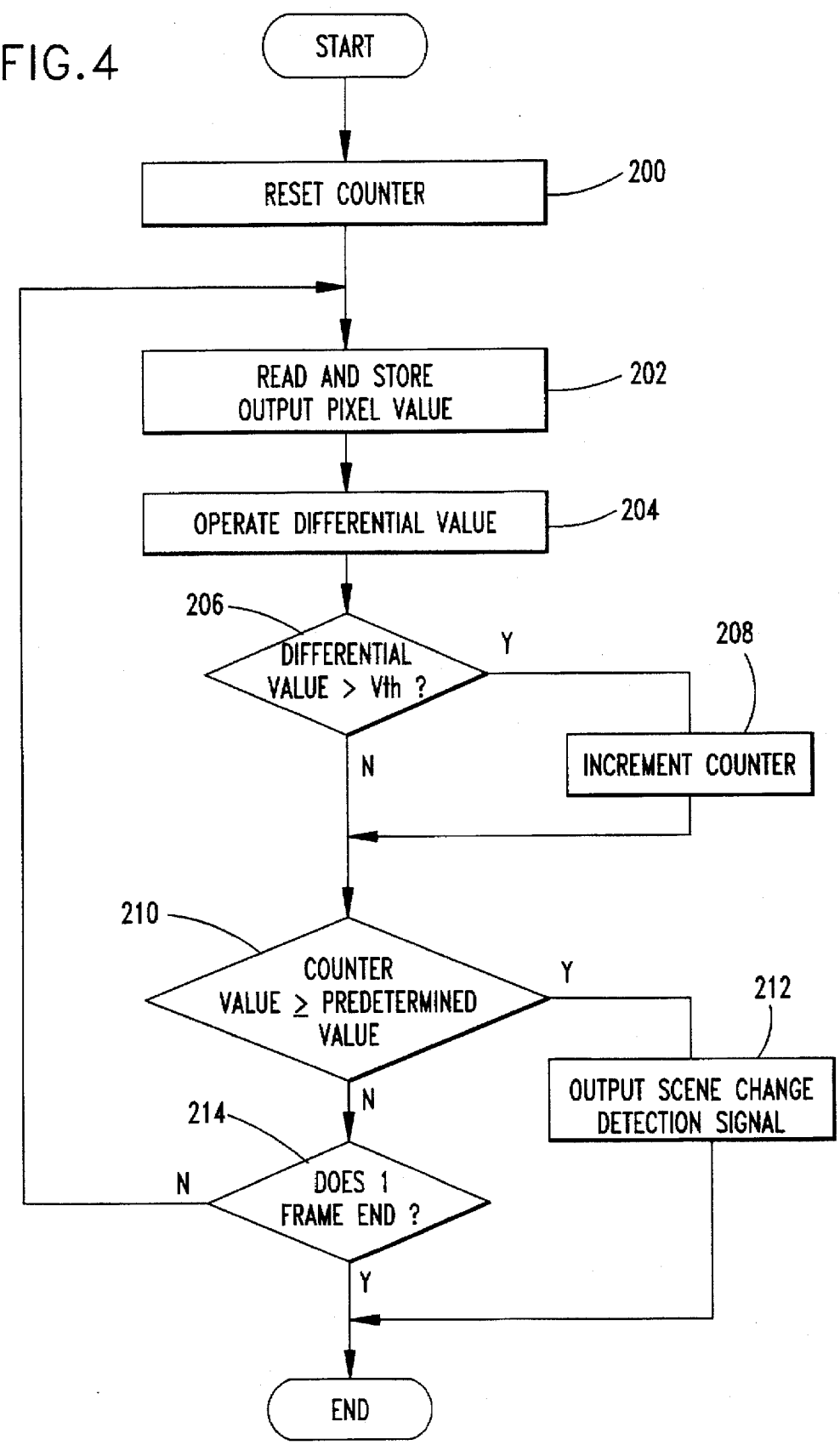

METHOD AND APPARATUS FOR SUPPLYING DATA

This is a continuation of application Ser. No. 08/358,132, filed Dec. 16, 1994, now abandoned.

BACKGROUND OF THE INVENTION

1. Field of the Invention

The invention relates to a method and apparatus for supplying data, and more particularly to a method and apparatus for supplying data for detecting scene switching in a motion picture based on digital image data, such as motion pictures which continue in succession by computer, etc.

2. Related Art

A motion picture can be displayed by consecutively displaying frames of digital image data which is supplied from an image data storage device of a computer, etc., on a monitor, etc. A motion picture is normally divided into a plurality of scenes by cutting, switching of camera angle, etc. Users may want to take out a desired scene from a motion picture to use it for something else. In this case, it is necessary to provide information dividing motion pictures for each scene in advance, that is, it is necessary to detect a scene switching location in a motion picture.

For this, in the past, the similarity of adjacent frames was defined and a threshold value of similarity was set in advance, and a frame exceeding the threshold value, that is, a frame in which similarity changes greatly, was taken as the switching location. These threshold values are roughly classified into two groups based on the type of feature amount set between frames: a first threshold value set with respect to similarity of pixels between frames and a second threshold value set with respect to the similarity of pixel distribution in a frame. With respect to the first threshold value, when a change exceeding a predetermined value occurs with respect to luminance, etc., for each pixel in a frame, it is taken as a pixel in which a change, such as scene switching luminance, occurred. With respect to the second threshold value, when the area of pixel distribution corresponding to the number of pixels where a luminance change, etc., occurs in a frame exceeds a predetermined value, it is regarded as a scene switching location.

As a method for supplying data for judging scene switching by such a threshold value, a method is known for supplying data processed by statistical distribution using the correlation of pixels between adjacent frames by input image signals, and a change detection method is known for detecting a change of scene by data processed using this data supply method (see PUPA No. 3-73076). This change detection method obtains similarity between frames from the distribution form and location of differential values about pixels based on the differential value of luminance for each pixel for adjacent frames and takes a frame exceeding a threshold value determined in advance, that is, a frame in which the similarity changes greatly as a scene switching location. Therefore, when the similarity of adjacent frames exceeds a threshold value, one of the adjacent frames (for example, an earlier one in a time series) is taken as a scene switching location, and frames starting with another one of the frames at the scene switching location detected last (for example, later one in a time series) up to a frame detected at present can be specified as one scene.

However, in a change detection method using said data supply method, in cases where a scene switching location is detected using a previously determined threshold value by supplying data which is processed by the correlation between adjacent frames, if a large value is set for the threshold, a detection failure may occur, such that a scene switching location is not detected for a small similarity and only a large scene switching is detected, etc. In contrast, if a small value is set for the threshold, the detection process becomes overly sensitive to change in similarity between frames and excess detection occurs, such that even a small similarity between frames which is not a scene switching is detected as a scene switching position.

This erroneous detection, such as detection failure and excess detection, will be explained with reference to drawings. FIG. 6 shows a frequency distribution of pixels concerning the absolute differential values of luminance values of pixels between adjacent frames. As shown in FIG. 6A, in the frequency distribution of pixels of ordinary brightness, etc., between frames, many frequencies occur where the absolute differential value is zero (0). The greater the absolute differential value, the smaller the occurrence frequency. In contrast, in the frequency distribution of pixels between frames where scene switching is assumed, as shown in FIG. 6B, the occurrence of an absolute differential value of zero (0) decreases and becomes a frequency distribution in which absolute differential values are distributed. Therefore, a threshold value, Vth, corresponding to the number of pixels expected to fluctuate in one scene, is set to detect frames assumed to be scene switching with respect to an absolute differential value. In this way, the number of pixels exceeding the threshold value, Vth, that is, an area exceeding area, Sa, corresponds to the number of pixels assumed to be scene switching. Therefore, in the distribution shown in FIG. 6B, the area (Sb–Sa) exceeds zero (0) and can be specified as a scene switching location.

However, in one scene where a frame itself is dark, as shown in FIG. 6C, the frequency distribution of pixels concentrates on values where the absolute differential value is small. In addition, as shown in FIG. 6D, similarly even in scene switching, the frequency distribution concentrates on values where the absolute differential value is small. Therefore, the area (Sd–Sa) obtained becomes almost zero (0) and cannot be specified as a scene switching location.

Moreover, in one scene consisting of a series of frames containing frames filmed with a flash apparatus, as shown in FIG. 6E, for example, even in one screen where only the brightness is different, the frequency distribution of pixels is distributed to values where the absolute differential value is large. Therefore, the area (Se–Sa) obtained exceeds zero (0) and can be specified erroneously to be a scene switching location.

SUMMARY OF THE INVENTION

The object of the invention is to provide a method and apparatus for supplying data, which can supply data enabling scene switching of a motion picture to be easily detected to divide a motion picture into individual scenes by taking the above facts into account.

A method for supplying data according to the invention to attain the object stated above is a method for supplying data for detecting scene switching in a motion picture in which a plurality of frames formed of a plurality of vertical and horizontal pixels continues in succession and which comprises a plurality of said scenes taking a group of frames whose signal contents are identical or similar as one scene, wherein said method operates statistics of pixel distribution for each frame using pixel data of each said frame and normalizes each pixel data of said frames using the operated statistics so as to respond to a pixel distribution in the reference frame which is determined in advance and supplies said normalized pixel data as data.

Moreover, an apparatus for supplying data according to the invention comprises a statistics operation means for operating statistics of a pixel distribution for each frame using pixel data of each said frame; a table generation means for generating a table which shows the correspondence between individual pixel data of said frame and normalized pixel data which correspond to a pixel distribution in the reference frame using the operated statistics; and a data supply means for supplying said normalized pixel data, to which said pixel data is converted, as data using the generated table, wherein pixel data of each frame of a motion picture is input in a time series for detecting scene switching in a motion picture in which a plurality of frames formed of a plurality of vertical and horizontal pixels continues in succession and which comprises a plurality of said scenes taking a group of frames whose signal contents are identical or similar as one scene.

In the method for supplying data according to the invention, a motion picture in which a plurality of frames formed of vertical and horizontal pixels continues in succession is used. A motion picture comprises a plurality of scenes taking a group of frames whose signal contents are identical or similar as one scene.

The statistics of pixel distribution are operated for said each frame using pixel data of each frame of this motion picture. These statistics include pixel distribution by brightness, such as luminance, and a mean and standard deviation of pixel distribution by color data expressed in color components R, G, and B, etc. Each pixel data of frames is normalized to respond to a pixel distribution in the reference frame, which is determined in advance, such as standard frames, using the operated statistics. Therefore, even in one scene in cases where frames themselves are dark or one scene consisting of a series of frames containing frames filmed with a flash apparatus, in the frequency distribution of pixel, influences, such as brightness involved in those frames are removed. Therefore, if this normalized pixel data is supplied as data, it means that the threshold value fluctuates dynamically with a brightness fluctuation of a motion picture in a time series, thereby enabling a scene switching contained in a motion picture to be detected.

Said method for supplying data can be realized by a data supply apparatus having a statistics operation means for operating statistics on pixel distribution for each frame using pixel data of each said frame; a table generation means for generating a table which shows the correspondence between individual pixel data of said frame and the normalized pixel data which corresponds to a pixel distribution in the reference frame using the operated statistics; and a data supplying means for supply said normalized pixel data, to which said pixel data is converted, as data using the generated table, wherein pixel data of each frame of a motion picture is input in a time series for detecting scene switching in a motion picture in which a plurality of frames formed of a plurality of vertical and horizontal pixels continues in succession and which comprises a plurality of said scenes taking a group of frames whose signal contents are identical or similar as one scene.

BRIEF DESCRIPTION OF THE DRAWINGS

Embodiments of the invention will be described now in detail with reference to the drawings, in which:

FIG. 4 is a flowchart showing a processing flow of a detector according to the embodiment

DESCRIPTION OF THE PREFERRED EMBODIMENTS

Figure 1:
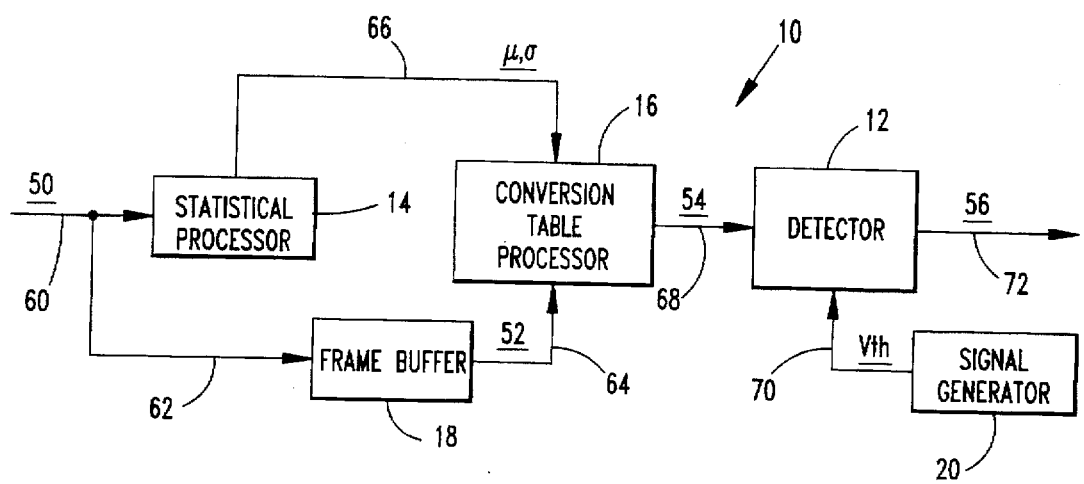
FIG. 1 is a block diagram roughly illustrating a motion picture processor according to an embodiment in which the invention can be applied.

As shown in FIG. 1, a motion picture processor to which the invention can be applied comprises a data output device 10 and a detector 12. The data output device 10 has a statistical processor 14 comprising a mean value operation circuit and a standard deviation operation circuit, a conversion table processor 16 comprising an operation circuit having memory (not illustrated), and a frame buffer 18 comprising a storage circuit, such as frame memory.

Analog data, such as video signals and RGB signals which constitute one frame are converted to digital data (hereafter called pixel data) 50 expressing the luminous value of each pixel of digital images comprising a number of vertical and horizontal pixels (e.g., 512 pixels vertically and 512 pixels horizontally) by a digital converter (not illustrated), such as an A/D converter, and are input into the data output device 10.

The digital data converter (not illustrated) is connected with the statistical processor 14 by a signal line 60, and this signal line 60 is connected to the frame buffer 18 by a signal line 62. Pixel data 50 is input to the statistical processor 14 and the frame buffer 18. The conversion table processor 16 is connected to the statistical processor 14 by a signal line 66 and to the frame buffer 18 by a signal line 64. The frame buffer 18 is for storing input pixel data 50 temporarily as pixel values 52 in frame units. Moreover, the conversion table processor 16 is connected to the detector 12 by a signal line 68. Therefore, the output pixel values 54, which will be described later, of the conversion table processor 16 are input to the detector 12.

Moreover, the detector 12 has a counter for counting the number of pixels, as described later. The detector 12 is connected to a signal generator 20 by a signal line 70 for outputting the threshold value, Vth. Furthermore, the detector 12 is connected to another device, such as a motion picture retrieval device using a scene change detection signal 56, which expresses scene switching, as an identification signal for extracting an identical scene, through a signal line 72.

The operation of the embodiment will be explained below.

When pixel data 50 is input to the statistical processor 14, the statistical processor 14 scans all pixels of the input frame sequentially, that is, reads input pixel data 50 sequentially and operates a mean value μ and a standard deviation α of luminance values with respect to one frame using all pixel data 50 of one frame. The statistical processor 14 outputs the operated statistics (mean value μ and standard deviation α) to the conversion table processor 16. At this time, pixel data 50 for one frame is stored in the frame buffer 18 as pixel values 52 corresponding to the pixel location on a frame.

Figure 3:
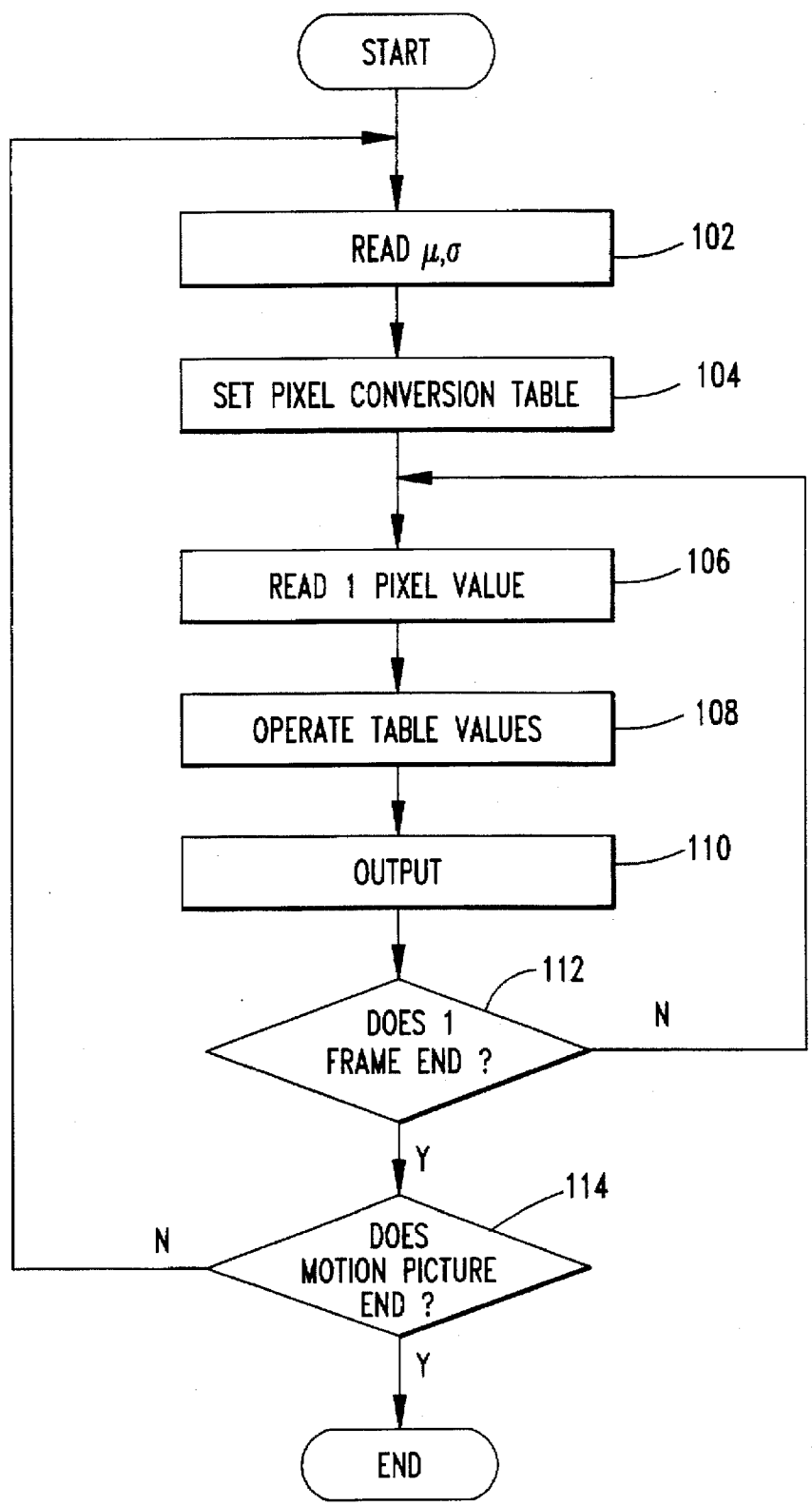
FIG. 3 is a flowchart showing a processing flow of a conversion table processor according to the embodiment.

Next, the processing of the conversion table processor 16 is explained with reference to FIG. 3. When statistics (mean value μ and standard deviation α) are input from the statistical processor 14, the data conversion routine shown in FIG. 3 is executed. The input statistics are read (step 102), and a function taking pixel values 52 as variables, using statistics, is set, as expressed in the following equation (1), as a pixel conversion table showing the correspondence between input pixel values 52 and values in the table t(i) and is stored in memory (step 104) (not illustrated).

$$t(i) = (i-\mu)/\alpha \tag{1}$$

where i=Input pixel value (0, 1, . . . , n; maximum luminous value)

t(i)=Table value of i-th entry.

Moreover, said pixel conversion table may store the correspondence between pixel values 52 input with respect to pixels for one frame and the operated values of the table t(i) as a pixel conversion table. In this way, storage capacity is needed only for the number of stages for pixel values, for example, the number of quantization.

When setting of the pixel conversion table has been completed, pixel values 52 are read sequentially from the frame buffer 18 in response to the pixel location of the frame (step 106) and the corresponding values of the table by the pixel conversion table, that is, the values of the table corresponding to pixel values 52 read using the above equation (1) are operated (step 108). The operated values of the table are output to the detector 12 as output pixel values 54 (step 110). The above processing is executed until pixel values 52 for one frame end (step 112) and processing is executed until all frames contained in a motion picture end (step 114).

Since output pixel values 54 are obtained from pixel values 52 output from the frame buffer 18, the mean value and standard deviation of pixel values stored in the frame buffer and the output pixel values 54 input to the detector 12 become normalized values equivalent to the pixel values of the standard frame by the mean and correlation of luminous values in a frame according to the pixel data for one frame input to the data output device 10. Therefore, an image formed of output pixel values 54 becomes an image equivalent to a reference frame which will be a standard luminous distribution.

Next, the processing of the detector 12 will be explained with reference to FIG. 4. When the output of output pixel values 54 for one frame from the conversion table processor 16 begins, the counter for counting the number of pixels is reset (step 200). Next, the normalized output pixel values 54 contained in the one input frame are read and stored (step 202), then the differential values between output pixel values 54 stored last and the read output pixel values 54 are operated (step 204). It is determined whether or not the operated differential value exceeds the threshold value, Vth (step 206). When "Yes" (the operated differential value exceeds the threshold value, Vth), the counter value is incremented (step 208). Since the counter value of this detector 12 is a value counting the number of pixels of output pixel values 54 which exceed the threshold value, Vth, input from the signal generator 20, it is equivalent to derivation of the distribution of the differential values of pixel values between frames corresponding to a frame which is scene switching. It is determined whether or not the counter value exceeds the predetermined value (step 210). When "No," the processing, is repeated until the processing, stated above, of output pixel values 54 for one frame end (step 214). When "Yes" in step 212, it is judged that the number of pixels equivalent to the frames where a scene is switched exists and the scene change detection signal 56 is output.

Moreover, the scene change detection signal 56 which is output from the detector 12 can be used as an address expressing the start or end of a motion picture.

Figure 5A:
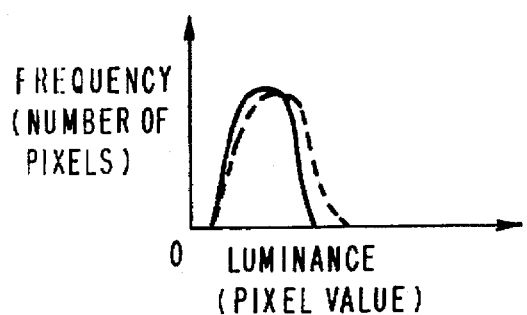
FIG. 5 is a explanatory drawing for explaining the process of detecting a scene switching in a motion picture processor according to an embodiment in which the invention can be applied.
Figure 5D:
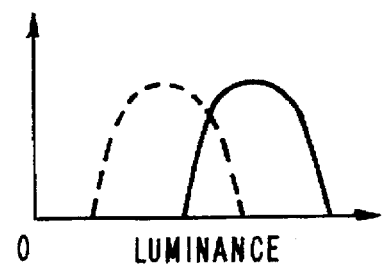
Figure 5B:
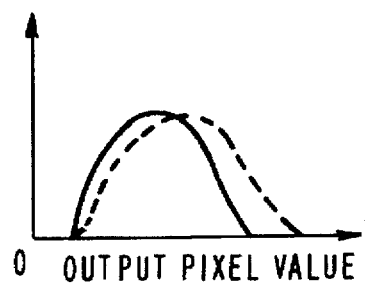
Figure 6A:
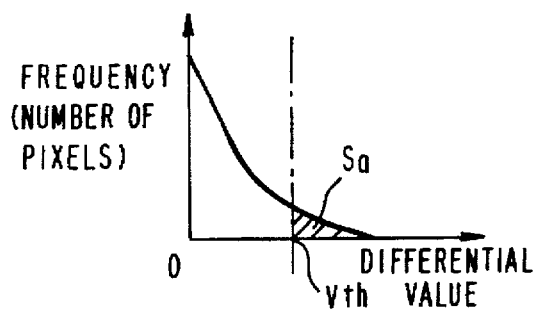
FIG. 6 is a diagram showing pixel distribution of differential values between frames which are used for detecting a scene switching with a conventional device.
Figure 6B:
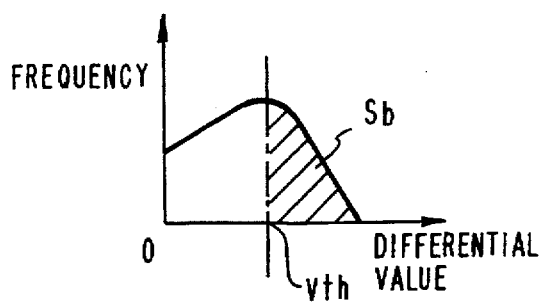
Figure 6C:
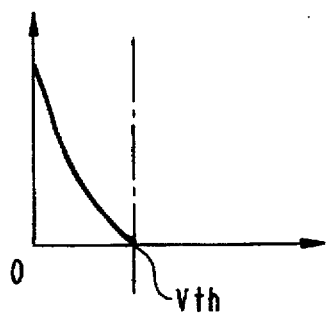
Figure 6D:
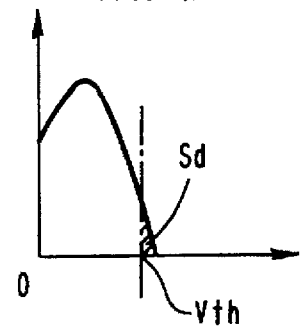

FIG. 5A shows luminous distributions of adjacent frames, which is scene switching in dark scene, with a solid line and a broken line. In this case, in the conventional method, the area equivalent to the number of pixels of differential values in scene switching is almost zero (0) and scene switching could not be specified (see FIG. 6D), but in the embodiment, since normalized output pixel values are used, the frequency distribution of pixels by luminous values is normalized, as shown in FIG. 5B, and the frequency distribution can be referenced regardless of the brightness of the scene.

Figure 5E:
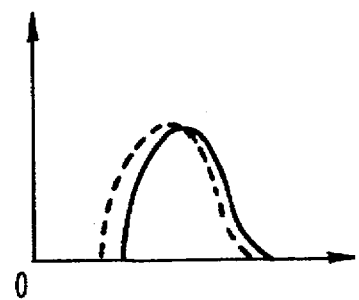
Figure 5C:
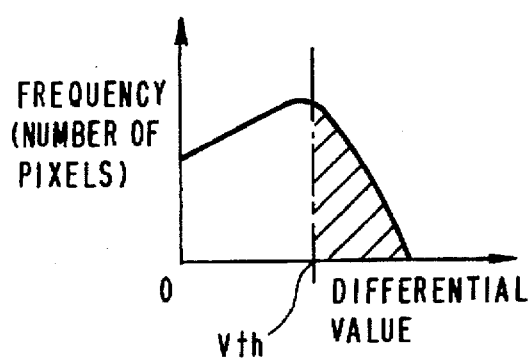

Therefore, as shown in FIG. 5C, the distribution of the numbers of pixels for differential values between frames is normalized, scene switching contained in a motion picture can be easily and reliably detected without detection failure, as, for example, if the threshold value fluctuates dynamically with the brightness fluctuation of a motion picture in a time series.

Figure 5F:
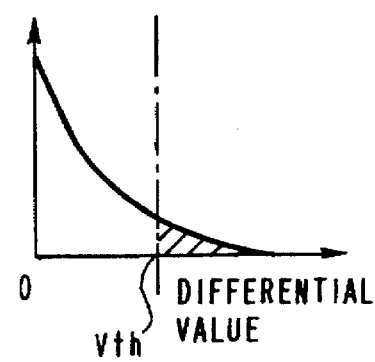
Figure 6E:
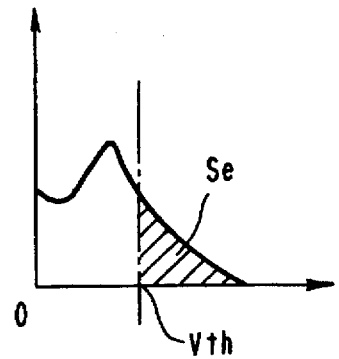

Moreover, FIG. 5D shows the luminous distribution of adjacent frames of one scene consisting of a series of frames including frames filmed with a flash apparatus with solid and broken lines. In this case, there is a difference in the location of the frequency distribution of pixels by luminous values between them, but the shape becomes a similar figure. In the conventional method, the differential value was large and erroneously specified as a scene switching location (see FIG. 6E). In the embodiment, similar to the above, scene switching is detected by the threshold value which is dynamically fluctuating with brightness fluctuation from the distribution (see FIG. 5E) by normalized output pixel values, scene switching is not detected erroneously even though a frame whose luminous value is instantaneously different from others is included in a scene (see FIG. 5F).

In this way, in the embodiment, the influence of luminous change in a frame in a time series and instantaneous luminous changes, such as flash and flicker, can be eliminated, thereby improving the detection rate in scene switching. Therefore, the threshold value, which is set as an initial value, can be used all the time without being reset for each motion picture or for each scene in one motion picture.

Moreover, in the above embodiment, the number of pixels for differential values exceeding the threshold value was counted to obtain an area of pixel number distribution for differential values between frames, but it can be arranged so that, after the distribution of pixels which exceed a threshold value is obtained after pixel distribution is obtained, an area is obtained by this distribution and scene switching is detected.

Figure 2:
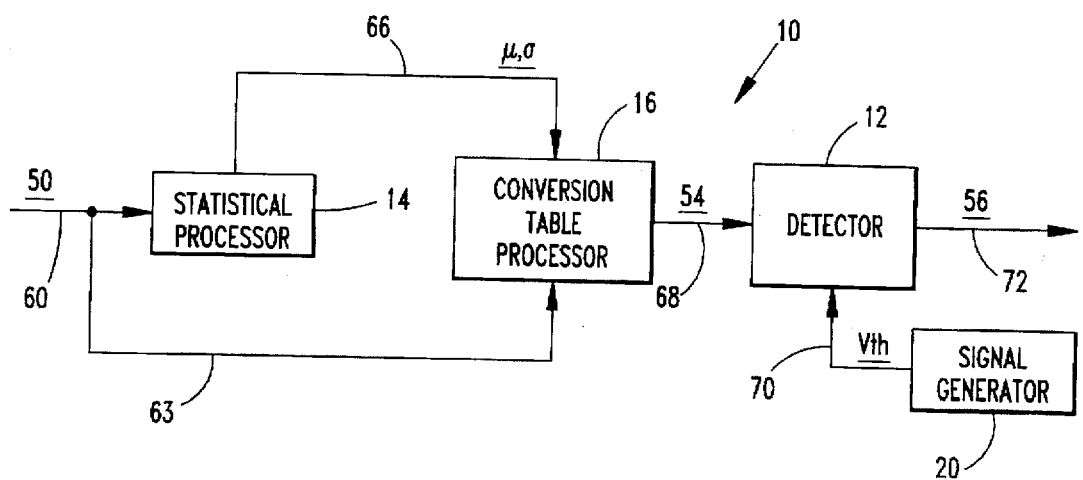
FIG. 2 is a block diagram roughly illustrating a motion picture processor according to another embodiment in which the invention can be applied.

In the above embodiment, to store pixel data of frames once in the frame buffer 18, the detection of scene switching is delayed for the time required for scanning one frame. For this, as another embodiment, in cases where scene switching is detected in real time, as shown in FIG. 2, the data output device 10 can be constituted by connecting the statistical processor 14 and the conversion table processor 16 by a signal line 63 so that pixel data (pixel value) can be input directly to the conversion table processor 16 without having the frame buffer 18. In this case, each of the detector 12, statistical processor 14, and conversion table processor 16 can be implemented in a configuration similar to the above embodiment. Moreover, predetermined statistics (e.g., mean value $\mu_0$ and standard deviation $\alpha_0$) are stored in the statistical processor 14 and the pixel conversion table by standard statistics is set in the conversion table processor 16 at the time of initial frame processing of a motion picture. In another embodiment, the configuration is similar to the above embodiment. Therefore, the operation of the conversion table processor 16 which is different from the above will be explained below.

In the conversion table processor 16, statistics $\mu$ and $\alpha$ are input from the statistical processor 14 (step 102 in FIG. 3) and the pixel conversion table is set by the above equation (1) and stored in memory (step 104). Next, pixel values 52 which are pixel data 50 are read sequentially (step 106) and the values of the table for pixel values 52 read from the pixel conversion table are operated (step 108). The values of this table are output to the detector 12 as output pixel values 54 (step 110). The above processing is executed until pixel values 52 for one frame end (step 112) and executed until all frames contained in a motion picture end (step 114).

In this way, in another embodiment, current pixel values are normalized to output pixel values using a pixel conversion table set based on the pixel data of the frame before. For this, it is actually not the normalization of pixel value of the current frame. It is not possible to deal with luminous change in which brightness changes instantaneously in frame units, such as flash and flicker but this is sufficiently effective in dealing with the erroneous detection of scene switching in scenes which have luminous changes of frames in a time series in a configuration according to another embodiment because it is assumed that the luminous change of frame in the time series is small.

Moreover, in the above embodiment, the similarity between frames is determined by luminous values of pixels, but the difference in brightness between frames can be used simply or the difference of difference between frames can be used. In addition, edge differential images in which images were processed in advance can be used as frame.

Moreover, in the above embodiment, the case where luminous values of pixels are used as pixel data is explained, but color intensity values or color-difference signals can also be used.

Moreover, in the above embodiment, the case where a scene switching using normalized pixel values and threshold values is detected is explained, but the invention is not limited to this. Scene switching can be detected from the pixel distribution in frame units of normalized pixel values. In this case, a standard frame is set in advance and up to an identical or similar frame can be taken as one scene.

As explained above, according to the invention, since normalized pixel data is supplied as data using the statistics of pixel distribution for each frame, it has the effect of detecting scene switching contained in a motion picture in response to the pixel distribution for each frame even if that scene contains frames having brightness changes in a time series of a motion picture or instantaneous brightness change, such as flashes.

I claim:

1. A method for supplying data for detecting scene switching in a motion picture in which a plurality of frames each formed of a plurality of vertical and horizontal pixels continues in succession and forms a plurality of scenes wherein a group of frames whose signal contents are identical or similar form one scene, wherein said method computes pixel distribution statistics for each frame using pixel data of each frame, normalizes pixel data of said frames using the computed pixel distribution statistics to create normalized pixels for each frame, and supplies said normalized pixels as input data to a detector of scene transitions, said detector of scene transitions comparing corresponding normalized pixels in successive frames to detect scene transitions.

2. An apparatus for supplying data, comprising:

a statistics operation means for operating statistics of pixel distribution for each frame using pixel data of each said frame;

a table generation means for generating a table which shows the correspondence between each pixel data of said frame and a normalized pixel data which corresponds to a pixel distribution in said frame using the operated statistics; and a data supply means for supplying said normalized pixel data, to which said pixel data is converted, as data using the generated table, wherein pixel data of each frame of a motion picture is input in a time series for detecting scene switching in a motion picture in which a plurality of frames formed of a plurality of vertical and horizontal pixels continues in succession and which has a plurality of said scenes taking a group of frames whose signal contents are identical or similar as one scene.

3. A method as in claim 1 wherein said computed pixel distribution statistics comprise a mean value and standard deviation of the pixel data of each frame.

4. An apparatus for supplying data to a motion picture scene transition detector, comprising:

a statistical processing means for computing pixel distribution statistics for each input frame from pixel data of each said input frame;

a table generation means for generating a frame of normalized pixels for each said input frame from said pixel data of each said input frame and from the computed pixel distribution statistics; and a data supply means for supplying said normalized pixels as input data to the motion picture scene transition detector, said motion picture scene transition detector comparing corresponding normalized pixels in successive frames to detect scene transitions, wherein pixel data of each frame of a motion picture is input to the statistical processing means in a time series for detecting scene switching in the motion picture by the motion picture scene transition detector, a plurality of frames formed of a plurality of vertical and horizontal pixels continuing in succession and wherein the motion picture has a plurality of said scenes each comprising a group of frames whose signal contents are identical or similar.

5. Apparatus as in claim 4 wherein said statistical processing means computes a mean value and standard deviation of the pixel data of each said frame.

6. Apparatus for detecting scene transitions in a motion picture, comprising:

statistical processing means for computing pixel distribution statistics for each frame of pixel data of a motion picture;

conversion processing means for converting said each frame of pixel data into a corresponding frame of normalized pixels using said computed pixel distribution statistics; and detector means for comparing corresponding normalized pixels in successive frames of said normalized pixels and detecting frames in which at least a threshold number of said normalized pixels have changed in value between successive frames by at least a threshold amount, each said detected frame corresponding to a scene transition.

7. Apparatus as in claim 6 wherein said statistical processing means computes a mean value and standard deviation of the pixel data of said each frame.

* * * * *